United States Patent [19]

Cargould

[11] Patent Number: 5,029,467
[45] Date of Patent: Jul. 9, 1991

[54] HYDRAULIC APPARATUS FOR TIRE UNIFORMITY MACHINE

[75] Inventor: Barry D. Cargould, Hudson, Ohio
[73] Assignee: Illinois Tool Works, Inc., Glenview, Ill.
[21] Appl. No.: 491,730
[22] Filed: Mar. 12, 1990
[51] Int. Cl.⁵ .......................................... G01M 17/02
[52] U.S. Cl. .................................................... 73/146
[58] Field of Search ........................................ 73/146

[56] References Cited

U.S. PATENT DOCUMENTS 4,852,398  8/1989  Cargould et al. ...................... 73/146

OTHER PUBLICATIONS

Eagle-Picher Drawing No. 1867, Schematic—Hyd Piping.

Primary Examiner—Donald O. Woodiel
Attorney, Agent, or Firm—Wood, Herron & Evans

[57] ABSTRACT

A tire uniformity machine has upper and lower chucks that carry rim halves. A hydraulic pump is connected to the lower rim half to raise and lower it to bring tires into position for testing. An accumulator is connected to the pump line to increase the speed of raising and lowering of the chuck.

6 Claims, 1 Drawing Sheet

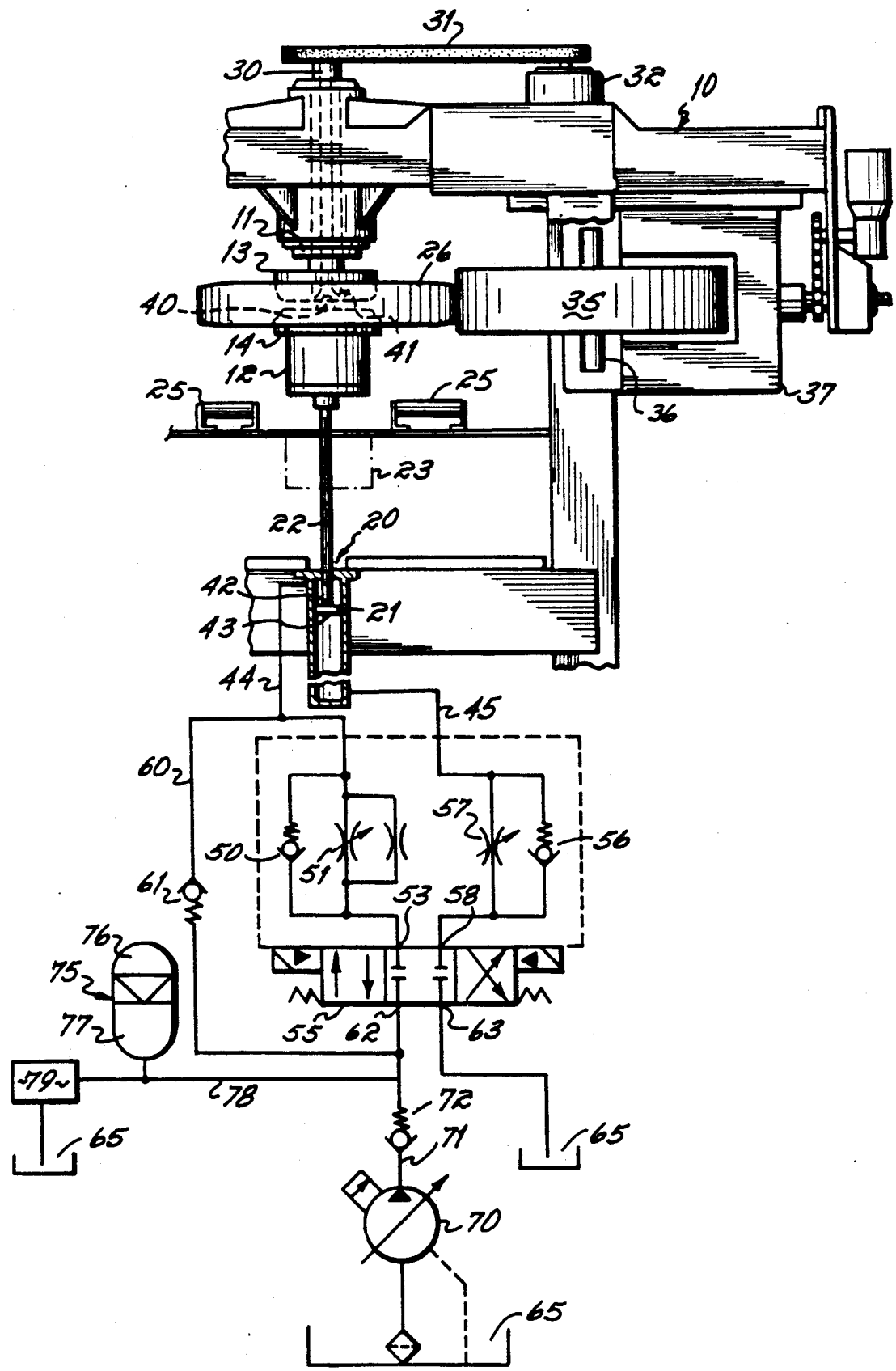

HYDRAULIC APPARATUS FOR TIRE UNIFORMITY MACHINE

BACKGROUND OF THE INVENTION

This invention relates to a tire uniformity machine, and more particularly, the invention relates to the hydraulic system for raising and lowering the lower chuck and rim of a tire uniformity machine.

An exemplary tire uniformity machine is depicted in U.S. Pat. No. 4,852,398, the disclosure for which is incorporated herein to form a part of the disclosure for the present invention. The function of the machine is to measure runout and radial and lateral force variations.

The machine includes an upper and a lower chuck which carry rim halves between which tires to be tested are inserted. The lower chuck is connected to a hydraulically-operated piston and cylinder which raises and lowers the lower chuck. A conveyor brings tires to be tested to a centered position between the upper and lower rim halves and conveys tested tires away.

In the testing operation, with the lower chuck down, a tire is brought into position between the two rim halves. The lower chuck is raised, capturing the tire on the lower rim and carrying the tire up to engagement with the upper rim. In some machines, mating nose cones on the upper and lower chucks, respectively, set the vertical spacing between the two chucks. In U.S. Pat. No. 4,852,398 that spacing is set by a combined electronic (LVDT) circuit and hydraulic system. When in position, the tire is inflated. It is engaged by a loadwheel and rotated until the measurement process is completed. Immediately thereafter, the loadwheel is disengaged, the lower chuck is lowered, the tested tire is conveyed away and an untested tire is conveyed into position between the chucks.

Tire makers normally test all passenger vehicle tires before shipping to the automobile manufacturers. All major automobile manufacturers require 100% testing. Thus, there is the need to test an enormous number of tires. Current tire testing machines, such as the machine depicted in U.S. Pat. No. 4,852,398, have an average cycle time of about 23.1 seconds. Such a machine can test on average 155.8 tires per hour. The cost of such a machine is of the order of $300,000. If as little as one second of cycle time can be saved, the capital cost per tire tested of a machine is significantly reduced.

BRIEF SUMMARY OF THE INVENTION

An objective of the present invention has been to reduce cycle time by almost two seconds. This objective has been attained by increasing the speed of raising and lowering of the lower chuck or rim that is mounted on the chuck. This increase in speed is in turn achieved by connecting an accumulator into the pump line to increase the volume of hydraulic fluid per unit of time that is delivered to the chuck cylinder. The accumulator is preferably sized to the cylinder and volume of oil to be displaced in the cylinder so that the accumulator can be refilled within the time that the chuck pauses at its upper position during testing or at its down position during reloading. Down position when reloading is the most critical because the duration of time in the down position is about 1.5 seconds.

BRIEF DESCRIPTION OF THE DRAWING

The several features and objectives of the invention will become more readily apparent from the following detailed description taken in conjunction with the accompanying drawing which is a diagrammatic side elevational view of the tire testing machine of the present invention.

DETAILED DESCRIPTION OF THE INVENTION

The tire testing machine of the present invention has a frame 10 on which is rotatably mounted an upper chuck 11 and a lower chuck 12. The upper chuck carries an upper rim 13 and the lower chuck carries a lower rim 14. The lower chuck is mounted on a hydraulic piston and cylinder. A cylinder 20 within which a piston 21 is reciprocably mounted raises and lowers the lower chuck. A piston rod 22 projects from the piston and is connected to the lower chuck 12 for raising it from a broken line position indicated at 23 to the upper full line position. A typical hydraulic cylinder has a 4" diameter bore and the piston has approximately a 20" stroke. A conveyor 25, positioned between the upper and lower positions of the chuck is provided for bringing tires 26 into the testing machine, centering them over the lower chuck and conveying the tires out of the testing machine after they have been tested.

When a tire 26 is centered on the conveyor in the tire testing machine, the piston 21 raises the lower chuck 12 to pick up the tire on its lower rim 14 and carry it into engagement with the upper rim 13. There, the tire is inflated and is ready for a test.

The upper chuck 11 is mounted on the spindle 30 driven by a timing belt 31 driven by a motor 32 to rotate the tire at a test speed.

A loadwheel 35 is supported on loadwheel spindles 36 for free rotation about an axis parallel to that of the tire 26. The loadwheel spindles 36 are in turn supported by a carriage 37 that is slidably secured to the frame 10 so as to be movable in the radial direction toward and away from the tire 26. The loadwheel 35 is, during the test, urged against the tire 26 to a preselected pressure which, when the tire is driven, tends to simulate road conditions. Under these conditions, the runout and force variations are measured.

In some tire testing machines, the lower chuck 12 has a nose cone 40 that seats in a conical receptacle 41 in the upper chuck. That seating determines the separation between rims and, hence, the bead width of the tire to be tested. In some machines the cone 40 is replaceable to change the bead width. In U.S. Pat. No. 4,852,398, the cones are engaged during the initial raising of the lower chuck 12 toward the upper chuck 11 and then the lower cone is backed down to position determined by the LVDT and a computer to adjust the bead width. In still other machines, the cone 40 and conical receptacle 41 are fixed without provision for adjustment.

Turning now to the hydraulic system, the piston 21 has a top side 42 and a bottom side 43. The cylinder 20 is fed hydraulic fluid or oil by a top line 44 and a bottom line 45 bringing fluid to the top side and bottom side, respectively, of the piston 21. Top line 44 is connected to a parallel connection of a one-way check valve 50 and a variable restrictor 51. The check valve 50 and restrictor 51 are connected at port 53 to a three-position solenoid-operated valve 55.

Bottom line 45 is connected to a parallel connection of a one-way check valve 56 and a variable restrictor 57. The check valve 56 and the restrictor 57 are connected at port 58 to the solenoid-operated valve 55.

A bypass line 60 having a one-way check valve 61 is connected from top line 44 to a port 62 of solenoid valve 55. Solenoid-valve also has a port 63 connected to a tank 65. A pump 70 is connected on one side to tank 65 and on the high pressure side to the port 62 through a pump line 71 having a one-way check valve 72.

An accumulator 75 has a gas side 76 precharged to 700 psi. The accumulator has an oil side 77 that is connected by a line 78 to the pump line 71 and port 62. A relief valve 79 is provided to relieve the pressure in the accumulator to the tank 65 when the testing machine is down.

The solenoid-operated valve 55 has three positions. In the illustrated center position, passage between ports 53 and 62 and 58 and 63 is blocked. When the valve is shifted to the right, as shown in the drawing (the chuck down position shown in broken lines 23), port 62 from the pump 70 and accumulator 75 is connected to port 53 thereby connecting the pump 70 and accumulator 75 to the top side of the piston 21 driving it down at high speed with hydraulic fluid from both accumulator 75 and pump 70. Also, the port 63 is connected to the port 58 permitting flow from the bottom side of the piston through restrictor 57 to the tank 65. In practice, the restrictor 57 is substantially wide open and even can be removed.

When the solenoid-operated valve 55 is shifted to the left as viewed in the drawing (the chuck up position), the port 62 is connected to port 58, thereby connecting the pump 70 and accumulator 75 directly through the one-way check valve 56 to the bottom side of the piston 21, thereby urging the piston upwardly with the combined fluids from the pump and accumulator. Port 63 is connected to port 53. Oil from the top side of the cylinder can pass through the top line 44 to the paralleled restrictor 51 and check valve 50. There, flow is impeded. However, the line 60 and check valve 61 create a regenerative circuit. The regenerative circuit passes the flow from the top side of the piston 21 to the pump and accumulator junction, thereby adding to the flow passing into the bottom side of the piston.

In an alternative form of the invention, where the regenerative circuit is not necessary, the regenerative circuit is eliminated and the restrictor valve 51 is opened to the extent needed to discharge the oil in the top side of the cylinder to the tank 65.

If it is found that the lower chuck 12 is crashing into the upper chuck at a speed that potentially damages the machine, the restrictor valve 51 can be replaced with a "slow down" or "proportional" valve that permits a rapid rise of the lower chuck 12 with rapid slowing of the chuck before the cones impact.

The accumulator is a 1½ gallon piston-type with a precharge of 700 psi. The pump 70 has sufficient capacity to fill the accumulator with hydraulic fluid, after discharge during the chuck down operation, back to 1000 psi within 1½ seconds which is normally the length of time in down position for the discharge of the tested tire and the introduction of the untested tire.

In operation, when a tire 26 is delivered into position between the two rims 13 and 14, the solenoid 55 is shifted to the chuck up position. Oil is delivered to the bottom side 43 of the piston 21 from the pump 70 from the accumulator 75 and from the regenerative circuit 60, 61. Testing requires a minimum of 10 seconds. During that time, the pump easily refills the accumulator to a pressure of 1000 psi. After testing, the solenoid valve 55 is shifted to chuck down. Oil from the bottom side of the piston 21 is discharged to the tank 65. The accumulator and pump deliver oil to the top side of the cylinder 21 to drive it down to its lowermost position. When the chuck is down, the testing tire is conveyed out of the testing machine and an untested tire is brought into the testing machine. During this period of time, for example 1½ seconds, the pump refills the accumulator to a pressure of 1000 psi. The system is then ready for another cycle.

The following chart illustrates the comparative times for the chuck up operation and the chuck down operation and the saving in time through the use of the accumulator:

|       | Accumulator Out | Accumulator In | Difference |
|-------|-----------------|----------------|------------|
| Up    | 1.30            | 0.73           | 0.57       |
| Down  | 1.95            | 0.72           | 1.23       |
| Total | 3.25            | 1.45           | 1.79       |

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. Apparatus for raising a lower chuck of a tire testing machine comprising:
    a cylinder having a vertical axis,
    a piston in said cylinder having a top side and a bottom side and a rod projecting from the upper end of said cylinder and connected to said lower chuck to raise said lower rim,
    a valve,
    lines from said top side and said bottom side of said piston to said valve,
    a pump and an accumulator connected to said valve to apply fluid under pressure to said valve,
    a tank connected to the low pressure side of said pump and said valve,
    said valve having a "chuck up" position connecting said accumulator, said pump, and the top side of said piston to the bottom side of said piston,
    said valve having a "chuck down" position connecting said accumulator and said pump to said top side of said piston and connecting the bottom side of said piston to said tank.

2. Apparatus as in claim 1 further comprising:
    a regenerative circuit connected between the top side of said cylinder and the junction between said pump and accumulator, and a one-way check valve in said regenerative circuit permitting flow only from said cylinder to said junction.

3. Apparatus as in claim 1 further comprising:
    a proportional valve connected to said cylinder to permit said piston a rapid rise and to retard it slightly before the lower chuck reaches its uppermost position.

4. In a tire testing machine having a lower chuck and a hydraulic piston and cylinder and pump for raising a tire to an upper chuck, the improvement comprising:
    an accumulator having a compressed air side and a hydraulic fluid side, and
    means for connecting said hydraulic fluid side to said hydraulic cylinder to assist said pump in moving said lower chuck.

5. In a tire testing machine as in claim 4, said accumulator is about a 1.5 gallon about 700 psi, said pump charging said accumulator to about 1000 psi in about 1.5 seconds.

6. In a tire testing machine as in claim 5, said cylinder being about 4 inches in diameter and said piston having about a 20 inch stroke.

* * * * *